(12) United States Patent
Nemoto et al.

(10) Patent No.: US 6,468,692 B1
(45) Date of Patent: Oct. 22, 2002

(54) LITHIUM SECONDARY BATTERY WITH SEALED CASING MEMBERS

(75) Inventors: Hiroshi Nemoto; Shinji Ohtubo; Toshihiro Yoshida, all of Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/579,898

(22) Filed: May 26, 2000

(30) Foreign Application Priority Data

Jun. 8, 1999 (JP) .......................................... 11-161194
Dec. 1, 1999 (JP) .......................................... 11-341741

(51) Int. Cl.$^7$ ................................................ H01M 2/08
(52) U.S. Cl. ...................... 429/174; 429/171; 429/173
(58) Field of Search .......................... 429/94, 54, 180, 429/171, 173, 174

(56) References Cited

U.S. PATENT DOCUMENTS 6,042,625 A * 3/2000 Daio ........................ 29/623.1
6,048,639 A * 4/2000 Sonozaki .................... 429/127
6,210,825 B1 * 4/2001 Takada ........................ 429/56

FOREIGN PATENT DOCUMENTS

| JP | 7-130341 | 5/1995 |
| JP | 9-92338 | 4/1997 |
| JP | 10-241645 | 9/1998 |
| JP | 10-340717 | 12/1998 |

* cited by examiner

Primary Examiner—Patrick Ryan
Assistant Examiner—Mark Ruthkosky
(74) Attorney, Agent, or Firm—Burr & Brown

(57) ABSTRACT

A lithium secondary battery contains an electrode body obtained by winding a positive electrode and a negative electrode via a separator, a non-aqueous electrolytic solution, and a battery case accommodating the electrode body and the non-aqueous electrolytic solution. A lid and a metal foil are adhered to each other with a resin to form a pressure-releasing valve and make air-tight the inside of the battery case. This secondary battery is easy to produce and has excellent operational safety and excellent reliability.

23 Claims, 7 Drawing Sheets

LITHIUM SECONDARY BATTERY WITH SEALED CASING MEMBERS

BACKGROUND OF THE INVENTION (1) Field of the Invention

The present invention relates to a lithium secondary battery easy to produce and superior in operational stability and reliability.

(2) Description of Related Art

In recent years, lithium secondary battery has been found practical application as a secondary battery small in size and high in energy density which can function as an electric source of electronic appliances such as portable communication appliance, notebook type personal computer and the like, which are becoming increasingly smaller. Further, in a situation where resource saving and energy saving are internationally drawing people's attention for the protection of global environment, lithium secondary battery fur use as a battery for driving the motor of electric vehicle or hybrid electric vehicle is being developed in the automobile industry. In the electric power industry, lithium secondary battery is expected as an equipment for night storage of electricity, for the effective use of electricity, and attention is being focussed on the early development of a practical large-capacity lithium secondary battery suitable for such application.

Lithium secondary battery uses a lithium transition metal compound oxide or the like as the positive electrode active substance and a carbon material such as hard carbon, graphite or the like as the negative electrode active substance. During charging, the lithium ion in the positive electrode active substance moves into the negative electrode active substance via an electrolytic solution which is a solution of lithium ion electrolyte in organic solvent, and is captured; during discharging, a reverse battery reaction takes place.

Thus, lithium secondary battery is a chargeable and dischargeable secondary battery. Since lithium secondary battery has a high voltage and a high energy density as compared with conventional secondary batteries such as lead-acid battery and the like, safety mechanisms are employed therein in order to avoid the troubles which may occur owing to abnormalities during charging and discharging. Lithium secondary battery needs to have, for example, a pressure-releasing valve as a safety mechanism for prevention of the bursting of battery which occurs owing to the increase in battery temperature caused by various reasons such as over discharging (due to the short circuiting of output terminal), rapid or excessive charging (due to the failure of charger), application of reverse-direction voltage (due to the mistake of operator) and the like.

In JP-A-10-340717 is disclosed, as an example of the pressure-releasing valve, a safety valve constituted by closing a pressure-releasing hole formed in the lid of battery, with a rectangular thin plate having grooves (these grooves are broken when the internal pressure of battery increases). Also in JP-A-9-92338 is disclosed a pressure-releasing valve constituted by fitting a valve pressed by a spring, to the lid of a battery to seal the battery (when the internal pressure of the battery increases, the valve pushes the spring to release the internal pressure).

The rectangular thin plate disclosed in JP-A-10-340717 is fitted to the lid of battery by laser welding. Therefore, the welding of the rectangular thin plate has problems in that a high equipment cost is required, the welding operation requires a skill, and uniform welding is difficult. The pressure-releasing valve disclosed in JP-A-9-92338 is provided in a state projecting from the end of battery; therefore, the workability of connecting a plurality of batteries in series or parallel is low, the connected batteries are presumably difficult to pack, and the large size and complicated internal structure of the pressure-releasing valve are considered to pose problems in weight and cost.

When a pressure-releasing valve having any one of the above-mentioned structures is used in a secondary battery, it is absolutely necessary, in order for the pressure-releasing valve to function as such, that the case of the battery is sealed tightly. Accordingly, it is necessary that at, for example, the area of the lid to which the pressure-releasing valve is fitted or the area at which the lid and the battery case are welded to each other, the associated members are tightly welded or sealed to each other.

As mentioned previously, in the lithium secondary batteries disclosed in JP-A-10-340717 and JP-A-9-92338, a metal pipe or the like is used as the battery case and the two ends thereof are sealed with a metal-made lid by laser welding; and there remain problems in equipment cost, production cost and workability.

In JP-A-10-241645 is disclosed a method of tight sealing by caulking of a gasket. In JP-A-7-130341 is disclosed a method of tight sealing by caulking of a gasket containing a propylene-ethylene copolymer.

In these tight sealing methods using a gasket, however, caulking is conducted without controlling the load of caulking or the deformation of gasket; therefore, the gasket is deformed in the plastic deformation range or the spring back of the metal (to which caulking is made) is not sufficiently absorbed; consequently, no sufficient a real pressure is obtainable and the leakage of non-aqueous electrolytic solution may occur.

SUMMARY OF THE INVENTION

In view of the above-mentioned problems of the prior art and the needed improvement therefor, the present invention aims at providing a lithium secondary battery of low cost wherein a pressure-releasing valve of simple structure has been fitted by a simple method while the reliability is retained.

According to the present invention, there is provided a lithium secondary battery comprising:

an electrode body obtained by winding or laminating a positive electrode and a negative electrode via a separator, a non-aqueous electrolytic solution, and a battery case accommodating the electrode body and the non-aqueous electrolytic solution, wherein two or more members are adhered to each other with a resin or pressure-welded to each other via an elastomer, or a resin is applied to or in the vicinity of the part where two or more members are pressure-welded, and thereby the battery case has a tightly sealed part.

In the lithium secondary battery of the present invention, the resin used is preferably an adhesive composed mainly of a polyimide, or a polyolefin type adhesive. A resin having good corrosion resistance to electrolytic solution and a high adhesive function is preferred. The members adhered or sealed using such a resin include a lid for battery case and a metal foil, which constitute a pressure-releasing valve. When there is employed a pressure-releasing valve constituted by closing a pressure-releasing hole formed in a lid of battery case, with a metal foil and when the metal foil is adhered to the lid using the above resin to close the pressure-releasing hole, the formation of the pressure-releasing valve is easy and simple and can be made for the lid per se. When the fixation of the metal foil is made using a resin and further employing caulking (the metal foil is pressure-welded), better sealing is secured.

As other form of the pressure-releasing valve, there can be mentioned a pressure-releasing valve constituted by closing a pressure-releasing hole formed in a lid of battery case, with a metal foil by means of bending a projection of the lid formed in the vicinity of the pressure-releasing hole, to caulk the metal foil via a spacer. As the spacer, a metal material having a Young's modulus of 170 GPa or more is used preferably. Use of a spacer of ring shape having a curvature at the inner edge is preferred because it can prevent the damage of the metal foil caused by contact with the spacer and can keep the properties of the pressure-releasing valve at a required level. The radius of the curvature at the inner edge of the spacer is preferably 30 μm or more and ½ or less of the spacer thickness.

In such a pressure-releasing valve using a metal foil, it is preferred to place, in the pressure-releasing hole of a battery lid, the metal foil and a resin film having corrosion resistance to electrolytic solution, in two layers so that the resin film faces the interior of battery, because the corrosion of the metal foil can be prevented more reliably. The metal foil and the resin film need not be adhered to each other, but may be adhered with an adhesive. When they are adhered, designing of battery need be made so that the pressure releasability of pressure-releasing valve is not changed. As the resin film, there can be used a film made of a polyethylene, a polypropylene, a polyimide and a fluororesin.

The metal foil is preferably one composed mainly of Al, Cu or Ni. A metal foil of higher purity is preferred because it has good corrosion resistance to non-aqueous electrolytic solution. The metal foil is preferably coated with a fluororesin. Of course, the metal foil may be made of an alloy of the above-mentioned metals.

When two members are pressure-welded via a metal foil to obtain tight sealing, there is, for example, a case that, in addition to the metal foil, an elastomer is interposed between the members. There is also a case that two members are pressure-welded via an elastomer alone to obtain tight sealing. In such a case, it is preferred to conduct pressure welding so that the deformation of the elastomer in the load direction becomes larger than the spring-back amount of the caulked portion and the stress applied to the elastomer becomes not smaller than 980 kPa and not larger than a level at which the retention of elasticity of the elastomer becomes 95% or more. Thereby, tight sealing is secured and the leakage of non-aqueous electrolytic solution can be prevented.

The elastomer used at the sealing part of the present lithium secondary battery is preferably an elastomer processed into a predetermined dimension, i.e. a packing. As the specific material for the elastomer, there can be mentioned an ethylene-propylene rubber, a polyethylene, a polypropylene and a fluororesin. It is preferred to provide, for at least one of the members pressure-welded to each other via an elastomer, a stopper for controlling the deformation of the elastomer. The stopper can be provided preferably in the pressure-releasing hole formed in the lid of the battery.

In the present lithium secondary battery, since the resin used has an excellent corrosion resistance, reliability is secured even when a non-aqueous electrolytic solution containing a carbonic acid ester type organic solvent is used.

Also in the present lithium secondary battery, use of a lithium manganese oxide spinel composed mainly of Li and Mn, having a cubic spinel structure, as the positive electrode active substance is preferred because an improvement in battery properties is obtained. The constitution employed in the present lithium secondary battery is preferably applicable to a battery having a capacity of 2 Ah or more. The resulting battery can be used preferably as an electric source battery for the motor of electric vehicle or hybrid electric vehicle.

DETAILED DESCRIPTION OF PREFERRED EMBODIMENTS

Next, description is made on the embodiments of the present invention with referring to the accompanying drawings. However, the present invention is not restricted to these embodiments.

Figure 1:
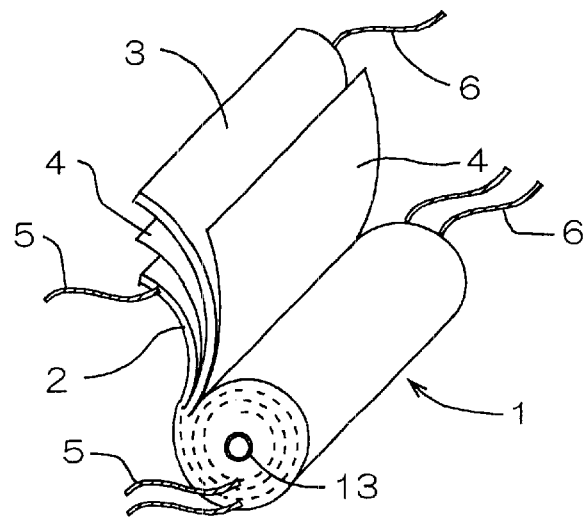
FIG. 1 is a perspective view showing the structure of a wound type electrode body.

One type of structure of the electrode body used in lithium secondary battery is a wound type. As shown in a perspective view of FIG. 1, a wound type electrode body 1 is constituted by winding, round a core 13, a positive electrode 2 and a negative electrode 3 via a separator 4 made of a porous polymer so that the positive electrode 2 and the negative electrode 3 make no direct contact with each other. A tab (electrode lead) 5 or 6 attached to the positive electrode 2 or the negative electrode 3 (hereinafter referred to as the electrode 2 or 3) may be at least one (in number); and it is easy to provide the tab 5 or 6 in a plurality of numbers for smaller collection resistance.

The positive electrode 2 is produced by coating a positive electrode active substance on both sides of a collection substrate. As the collection substrate, there is used a metal foil having good corrosion resistance to electrochemical reaction of positive electrode, such as aluminum foil, titanium foil or the like. Besides, there can be used a punched metal or a mesh. As the positive electrode active substance, there is preferably used a lithium transition metal compound oxide such as lithium manganese oxide, lithium cobalt oxide, lithium nickel oxide, or the like. Preferably, a fine carbon powder such as acetylene black or the like is added as a conductivity-improving agent.

Use of, in particular, lithium manganese oxide having a cubic spinel structure (hereinafter referred to as "lithium manganese oxide spinel") as the positive electrode active substance is preferred because the use, as compared with use of other positive electrode active substance, can allow the electrode body 1 to have a small resistance. The coating of the positive electrode active substance can be conducted by adding a solvent, a binder, etc. to a positive electrode active substance powder to prepare a slurry or a paste, coating the slurry or paste on a collection substrate using a roll coater or the like, and drying the resulting material. Thereafter, pressing or the like is conducted as necessary.

The lithium manganese oxide spinel is not restricted to a stoichiometric composition alone; and a spinel represented by a general formula $LiM_xMn_{2-x}O_4$ (M is a substitution element and X is a substitution amount) obtained by substituting part of Mn of the stoichiometric composition with other element, may also be used preferably. As the substitution element M, there can be mentioned Li, Fe, Mn, Ni, Mg, Zn, B, Al, Co, Cr, Si, Ti, Sn, Ti, Sn, P, V, Sb, Nb, Ta, Mo and W.

The substitution element M is occluded in $LiMn_2O_4$ theoretically in the form of monovalent (Li), bivalent (Fe, Mn, Ni, Mg or Zn), trivalent (B, Al, Co or Cr), tetravalent (Si, Ti or Sn), pentavalent (P, V, Sb, Nb or Ta) or hexavalent (W) ion. Co and Sn may also be bivalent; Fe, Sb and Ti may also be trivalent; Mn may also be trivalent or tetravalent; and Cr may also be tetravalent or hexavalent. Therefore, the substitution element M may be present in a mixed valency state depending upon the kind. The amount of oxygen need not be 4 as in the case of stoichiometric composition and may be partly short or excessive as long as the required crystal structure is maintained.

The negative electrode 3 can be produced in the same manner as for the positive electrode 2. As the collection substrate of the negative electrode 3, there is preferably used a metal foil having good corrosion resistance to electrochemical reaction of negative electrode, such as copper foil, nickel foil or the like. As the negative electrode active substance, there is used an amorphous carbon material (e.g. soft carbon or hard carbon) or a highly graphitized carbon powder (e.g. artificial graphite or natural graphite).

As the separator 4, there is preferably used a three-layer separator obtained by interposing a microporous, lithium ion-transmittable polyethylene film (PE film) between porous, lithium ion-transmittable polypropylene films (PP films). In this separator, when the temperature of the electrode body 1 increases, the PE film softens at about 130° C., the micropores are collapsed, and the movement of lithium ion, i.e. the battery reaction is suppressed; thus, the separator functions also as a safety mechanism. By interposing the PE film between the PP films of higher softening point, the PP films retain the shape even when the PE film softens, whereby the contact and short-circuiting between the positive electrode 2 and the negative electrode 3 is prevented, battery reaction is prevented reliably, and safety is secured.

During the operation of winding the electrodes 2 and 3 and the separator 4, a tab 5 or 6 is fitted to the area of the electrode 2 or 3 at which no electrode active substance is coated and where the collection substrate is exposed. As the tab 5 or 6, there is preferably used a foil made of the same material as for the collection substrate of the electrode 2 or 3. The fitting of the tab 5 or 6 to the electrode 2 or 3 can be conducted by ultrasonic welding, spot welding or the like. Preferably, the tab 5 or 6 is fitted to one end of the electrode body 1 and the other tab is fitted to other end of the electrode body 1, because contact between the tab 5 and the tab 6 is avoidable.

The produced electrode body 1 is placed in a battery case in a state that the tab 5 or 6 is connected to a terminal for taking out the electricity generated, to outside; the electrode body 1 is impregnated with a non-aqueous electrolytic solution; then, the battery case is sealed; thereby, a battery is produced.

Figure 2:
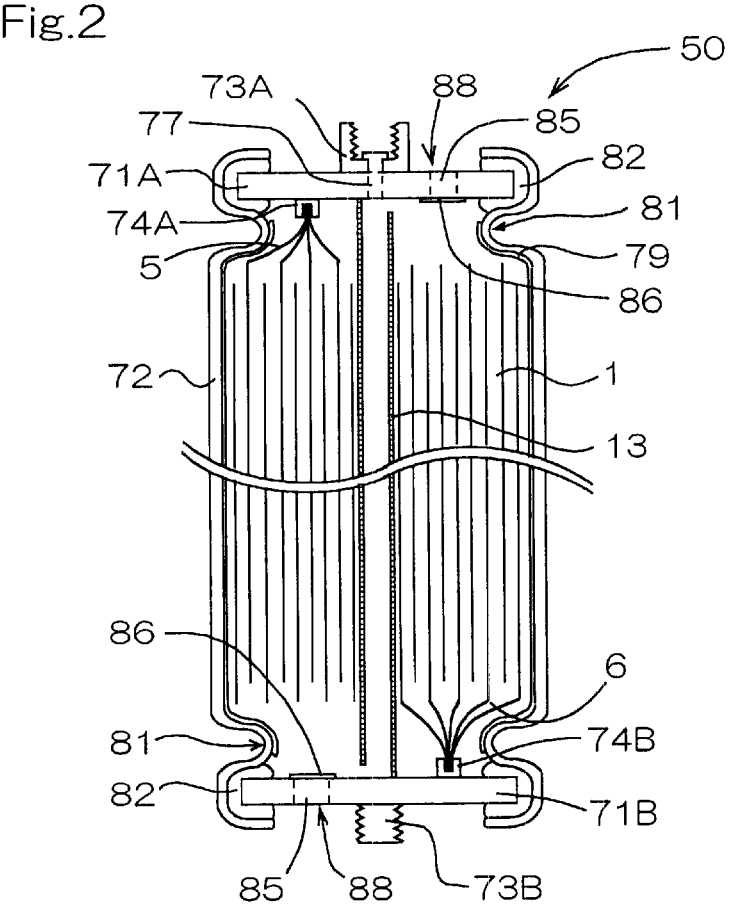
FIG. 2 is a sectional view showing one embodiment of the present lithium secondary battery using a wound type electrode body.

FIG. 2 is a sectional view showing one embodiment of the lithium secondary battery of the present invention using a wound type electrode body 1. In a battery 50, the tab 5 or 6 of an electrode body 1 is collectively connected, by caulking, to a rivet used as a positive electrode internal terminal 74A made of aluminum, or as a negative electrode internal terminal 74B made of copper. The positive electrode internal terminal 74A is welded to a positive electrode lid 71A made of aluminum; to the positive electrode lid 71A is welded a positive electrode external terminal 73A of female screw shape, made of aluminum; whereby a current path is formed.

Beneath the positive electrode external terminal 73A is formed an inlet 77 for electrolytic solution which penetrates the positive electrode lid 71A. The positive electrode lid 71A has a pressure-releasing hole 85 and also has a metal foil 86 adhered thereto so as to close the pressure-releasing hole 85 from the inner side of battery, whereby a pressure-releasing valve 88 is formed.

The structure of the negative electrode side of battery is similar to that of the positive electrode side. A negative electrode internal terminal 74B, a negative electrode lid 71B and a negative electrode external terminal 73B of male screw shape are preferably made of copper. The negative electrode lid 71B has a pressure-releasing valve 88 but has no inlet 77 for electrolytic solution. Such external terminals 73A and 73B formed in such shapes as to allow mutual bonding are preferred because a plurality of batteries 50 having such external terminals can be connected in series easily. The connection can be made simply by rotating one battery 50 to screw its negative electrode exterior terminal 73B into the positive electrode external terminal 73A of other battery 50.

Projections 81 of battery case 72 are formed by placing, in a cylindrical battery case 72, the electrode body 1 fitted with the internal terminals 74A and 74B, etc. of the positive and negative electrodes, and subjecting the battery case 72 to squeezing at the positions close to the two ends of the electrode body 1. The two ends of the battery case 72 are subjected to caulking using an insulating sealing material 82 so that the battery case 72 and the lid 71A or 71B of the positive or negative electrode do not communicate with each other, whereby sealing is made. Between the electrode body 1 and the inside of the battery case 72 is provided an insulating polymer film 79, whereby insulation is secured between the electrode body 1 and the battery case 72.

Filling of a non-aqueous electrolytic solution into the battery 50 can be easily conducted, for example, by placing the battery 50 in a vacuum atmosphere with the inlet 77 for electrolytic solution positioned above, inserting a nozzle (for injection of electrolytic solution) into the bottom of the battery in such a manner that the nozzle passes through the inlet 77 and the hollow portion of the core 13, pouring a required amount of a non-aqueous electrolytic solution to thoroughly impregnate the electrode body 1 with the electrolytic solution, discharging the excessive portion of the electrolytic solution using the nozzle in an inert gas atmosphere, and sealing the inlet 77 for electrolytic solution, with a screw.

As the non-aqueous electrolytic solution, there can be preferably used a solution obtained by dissolving at least one kind of electrolyte selected from lithium complex fluorine compounds (e.g. $LiPF_6$ and $LiBF_4$), lithium halides (e.g. $LiClO_4$), etc., in a single or mixed organic solvent selected from carbonic acid esters [e.g. ethylene carbonate (EC), diethyl carbonate (DEC), dimethyl carbonate (DMC) and propylene carbonate (PC)], $\gamma$-butyrolactone, tetrahydrofuran, acetonitrile, etc.

Figure 3:
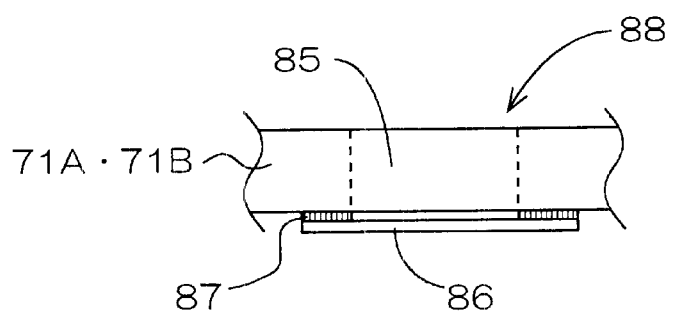
FIG. 3 is a sectional view showing one embodiment of the structure of the pressure-releasing valve preferably used in the lithium secondary battery of the present invention.

Next, in-depth description is made on the pressure-releasing valve 88 provided in the lid 71A or 71 B. FIG. 3 is an enlarged sectional view of the structure of the pressure-releasing valve 88 shown in FIG. 2. In the present invention, the fitting of a metal foil 86 (which is to close a pressure-releasing hole 85) to the lid 71A or 71B is preferably conducted using, as a resin 87, an adhesive composed mainly of, in particular, a polyimide. Three important cares which must be taken in using a resin material in lithium secondary battery, are heat resistance, corrosion resistance to electrolytic solution and tight sealing.

Polyimide resins have high curing temperatures of about 200 to 300° C. and are superior in heat resistance. Once the temperature of electrolytic solution increases, the breakage of pressure-releasing valve takes place owing to the vaporization of electrolytic solution and consequent increase in battery pressure, earlier than the deterioration of polyimide resin, whereby the function of pressure-releasing vale is fulfilled. There are cases that the electrolytic solution contains a carbonic acid ester type organic solvent (this solvent is capable of dissolving various kinds of resins). Polyimide resins have excellent corrosion resistance even to such a non-aqueous electrolytic solution. Further, polyimide resins can provide good sealing between members and show an excellent adhesive property.

It is possible to use, as the resin 87, a polyolefin type adhesive, specifically a polypropylene type rubber or the like. However, from the standpoints of adhesivity and heat resistance, use of a polyimide resin is preferred.

As the metal foil 86 as part of the pressure-releasing valve 88, there is preferably used one composed mainly of Al, Cu or Ni. Since the metal foil 86 makes direct contact with an electrolytic solution, it preferably has excellent corrosion resistance to electrolytic solution, that is, a high purity. Needless to say, the metal foil 86 may be composed of an alloy of the above metals. A metal foil 86 coated with a fluororesin is also preferred because improvement in durability is obtained.

Such a pressure-releasing valve 88 can be formed simply by coating the resin 87 on the lid 71A or 71B before assembling of battery, at the circumference of the pressure-releasing hole 85, pressing the metal foil 86 onto the coated resin, and allowing the resulting material to stand in a drier. This provides various advantages such as reduction in equipment cost, simplification in battery assembling operation, and improvement in production yield.

The position of the pressure-releasing valve 88 in the lid 71A or 71B is not restricted to that shown in FIG. 3. It is possible to form a plurality of pressure-releasing valves 88 in the lid 71A or 71B, in view of the position of the internal terminal 73A or 73B.

In the pressure-releasing valve 88, the pressure-releasing hole 85 is closed with the metal foil 86 from the inner side of the battery 50. It is also possible to close the pressure-releasing hole 85 from the outer side of the battery 50; in this case, however, care must be taken so as to avoid the damage of the metal foil 86 by a external force. Therefore, it is preferred to use a structure in which the pressure-releasing hole 85 is closed with the metal foil 86 from the inner side of the battery 50. In this case, in order for the function of the pressure-releasing valve 88 not to be deteriorated, it is possible to attach a metal mesh or the like to the outer side of the lid to cover the pressure-releasing hole 85 and protect the metal foil 86.

Figure 9:
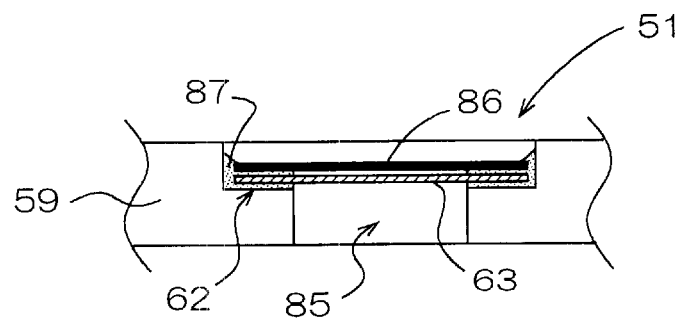
FIG. 9 is a sectional view showing other embodiment of the structure of the pressure-releasing valve preferably used in the lithium secondary battery of the present invention.

Next, other embodiment of the pressure-releasing valve used in the present invention is shown in FIG. 9. In this pressure-releasing valve 51, a dented portion 62 is formed at one aide of a lid 59; at the bottom of the dented portion 62 are fixed, in layers, a resin film 63 (lower) and a metal foil 86 (upper) using a resin 87. Needless to say, a pressure-releasing hole communicates with the bottom of the dented portion 62. In assembling a battery, the lid 59 is placed so that the resin film 63 faces the interior of the battery.

Since an electrolytic solution makes direct contact with the resin film 63 and the resin 87, there is preferred, as the resin film 63, a film having excellent corrosion resistance to electrolytic solution, such as polyethylene film, polypropylene film, polyimide film or fluororesin. Since the resin film 63 and the metal foil 86 are fixed with the resin 87 alone, there is preferred, as the resin 87, a polyimide resin as in the above-mentioned pressure-releasing valve 88.

In the pressure-releasing valve 51, since the resin film 63 is used, the metal foil 86 makes no direct contact with an electrolytic solution. Therefore, it is possible to use, as the metal foil 86, a metal foil having no corrosion resistance to electrolytic solution, a low-purity Al foil or the like. However, when corrosion of the metal foil 86 caused by the progress of corrosion of the resin film 87 is considered, the metal foil 86 is preferably a high-purity Al foil or the like, having excellent corrosion resistance to electrolytic solution.

Figure 10:
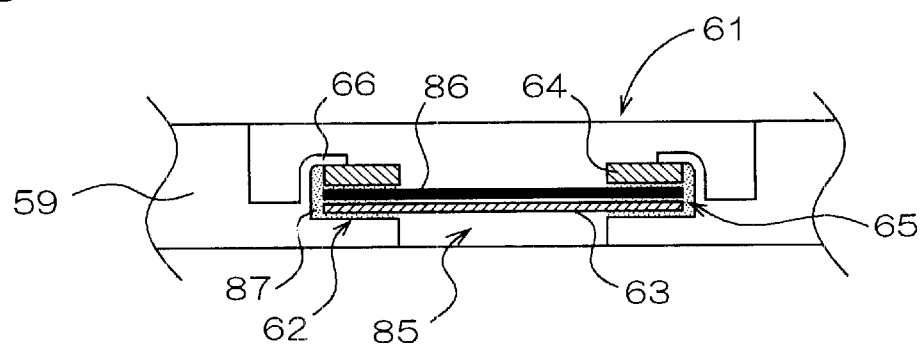
FIG. 10 is a sectional view showing still other embodiment of the structure of the pressure-releasing valve preferably used in the lithium secondary battery of the present invention.

Next, still other embodiment of the pressure-releasing valve used in the present invention is shown in FIG. 10. In this pressure-releasing valve 61, a dented portion 62 is formed at one side of a pressure-releasing hole 85 formed in a lid 59; on the bottom of the dented portion 62 are placed a resin film 63, a metal foil 86 and a metallic spacer (a washer) 64 (these members are hereinafter referred to as "the resin film 63, etc.") in this order. Between the individual members of the resin film 63, etc. and between the side of the dented portion 62 and the resin film 63, etc. is filled and cured a resin 87. The side of the dented portion 62, which was originally formed as a projection 66, is bent, whereby the resin film 63, etc. are caulked and fixed strongly.

In producing a battery, a lid 59 is fixed so that the resin film 63 faces the interior of the battery. Since an electrolytic solution makes direct contact with the resin film 63 and the resin 87, the resin film 63 and the resin 87 are preferably made of a material having excellent corrosion resistance to electrolytic solution, as in the case of the pressure-releasing valve 51. As the metal foil 86, a metal foil having no corrosion resistance to electrolytic solution, a low-purity Al foil, or the like can be used.

The washer 64 is preferably made of a metal. The metal preferably has a Young's modulus of 170 GPa or more in order to avoid a case where the washer 64 per se is stretched by caulking and no sufficient caulking pressure is applied. No corrosion resistance to electrolytic solution is required for the washer 64. Therefore, the washer 64 can be made of various materials such as stainless steel and the like. However, when the progress of corrosion of the resin 87 is considered, each of the metal foil 86 and the washer 64 is preferably made of a material having excellent corrosion resistance to electrolytic solution. The washer 64 may also be made of an engineering ceramic.

The further feature of the pressure-releasing valve 61 lies in that the resin film 63, etc. are fixed by caulking of the projection 66. As in the above-mentioned pressure-releasing valves 88 and 51, the metal foil 86 and/or the resin film 63 is fixed using the resin 87 and thereby the pressure-releasing hole 85 may be closed. When, in addition thereto, caulking is conducted utilizing the elasticity of the resin 87 to fix the resin film 63, etc., there are obtained the tightness of the pressure-releasing valve 61, improved fixation strength, and improved reliability.

In the pressure-releasing valve 61, therefore, no strong adhesivity is required for the resin 87, and the most important property for the resin 87 is to show appropriate elastic deformation to caulking and have corrosion resistance to electrolytic solution. Hence, as the resin 87, there is preferred a polyolefin type resin (e.g. ethylene-propylene rubber, polyethylene or polypropylene) or a fluororesin. A polyimide resin may also be used, but hardly shows appropriate elastic deformation to caulking.

In the pressure-releasing valve 61, it is not necessary that the resin 87 is used in a particular restricted site as seen in FIG. 10. It is possible that, as in a pressure-releasing valve 69 (described later) shown in FIG. 12, there is used, as the resin 87, a packing corresponding to the shape of the pressure-releasing valve 61 and that the packing is caulked while showing appropriate elastic deformation, to fix the resin film 63, etc.

Since the resin 87 and the resin film 63 can be considered as an elastomer, it is preferred that, in caulking the resin film 63, etc., the deformation of the elastomer in the load direction (the vertical direction in FIG. 10) is larger than the spring-back amount of the caulked portion and that the stress applied to the elastomer is not smaller than 980 kPa and not larger than a level at which the retention of elasticity of the elastomer becomes 95% or more.

The spring-back amount of the caulked portion refers to a displacement from standard position which appears when, in FIG. 10, the resin film 63 and the resin 87 are removed and only the washer 64 and the metal foil 86 are subjected to caulking by an autograph (this position is taken as a standard position), and then the load applied is gradually decreased (with the displacement being monitored) and finally released completely. Therefore, when the deformation of the elastomer in the load direction is larger than the spring-back amount of the caulked portion, no gap appears even after the completion of caulking and thereby there occurs no leakage of non-aqueous electrolytic solution.

The retention of elasticity of the elastomer is expressed by a change in thickness before and after application of stress when a compression stress is applied to the elastomer processed so as to have a shape of, for example, 10 mm (outer diameter)×7 mm (inner diameter)×1 mm, using an autograph and the compression stress is released after the lapse of a given time. That is, when the thickness of the elastomer before application of stress is $A_1$ and the thickness of the elastomer after application of stress is $B_1$, the elasticity retention D of the elastomer is given as follows.

$$D = (B_1/A_1) \times 100$$

An elasticity retention of 95% or more can promise a required elasticity and a required plane pressure. Meanwhile, in conducting caulking, it is necessary to apply, to the elastomer, such a stress that is not larger than the pressure at which the pressure-releasing valve 61 operates and that causes no leakage of electrolytic solution from the pressure-releasing hole 85. 980 kPa is a yardstick for the pressure at which the pressure-releasing valve 61 operates. Therefore, when the operable pressure of the pressure-releasing valve 61 is set low, the stress applied to the elastomer for caulking can naturally be small.

FIGS. 13(*a*) to 13(*d*) show a relation between stress applied and elasticity retention or displacement, of an elastomer [ethylene-propylene rubber (*a*), fluororesin (*b*), polyethylene (*c*) or polypropylene (*d*)] processed into a size of 10 mm (outer diameter)×7 mm (inner diameter)×1 mm. The slant line area shown in each FIG. is a preferred range of the present invention and an area where good sealing is obtained. As is clear from FIGS. 13(*a*) to 13(*d*), the range of stress applicable to elastomer differs depending upon the material of the elastomer used.

Viewed from the above utilization of the elasticity of the resin 87, it is also possible to utilize the elasticity possessed by the resin film 63. In this case, the presence of the resin 87 is not necessary. For example, when a polyethylene film, a polypropylene film or a fluororesin film is used as the resin film 63, even if no resin 87 is used, sufficient tightness of pressure-releasing valve can be secured only by caulking. As the resin film 63, a polyimide film may also be used.

In forming a pressure-releasing valve 61, first, there is prepared a lid 59 in which a dented portion 62 and a projection 66 (this is projected perpendicularly relative to the surface of the lid, before caulking) have been formed; in the dented portion 62 are placed a resin film 63 and a metal foil 86, and a resin 87 is filled; then, a washer 64 is placed, followed by curing of the resin 87. Alternatively, it is possible that the metal foil 86 and the washer 64 are placed and then the resin 87 is filled and cured. Subsequently, the projection 66 is gradually bent using a jig so as to avoid the breakage of the projection 66, to conduct caulking at a given pressure, whereby a pressure-releasing valve 61 can be formed. Incidentally, by forming a gap 65 between the resin film 63, etc. and the side of the dented portion 62, it is possible to prevent the deformation of the resin film 63, etc. caused by the deformation of the projection 66 and also to conduct the filling of the resin 87 easily.

In the pressure-releasing valve 61, the metal foil 86 and the washer 64 make direct contact with each other at a high pressure, in most cases. Therefore, when there is used, as the washer 64, a ring-shaped material having, at the inner edge, a projection such as fin or the like, the metal foil 86 is damaged by the fin or the like, the tightness inside battery is lost, and there occurs leakage of non-aqueous electrolytic solution or pressure release at a low battery-inside pressure.

Hence, it is preferred to allow the inner edge of the washer 64 to have a curvature because the damage of the metal foil 86, caused by the contact with the washer 64 can be avoided and the pressure-releasing valve 61 can maintain a required function. Incidentally, the radius of curvature at the inner edge of the washer 64 is preferably 30 µm or more and ½ or less of the thickness of the washer 64.

Figure 11A:
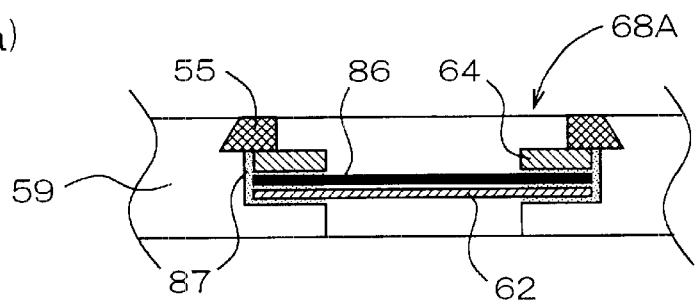
FIGS. 11(a)–11(c) are sectional views showing still other embodiment of the structure of the pressure-releasing valve preferably used in the lithium secondary battery of the present invention.
Figure 11B:
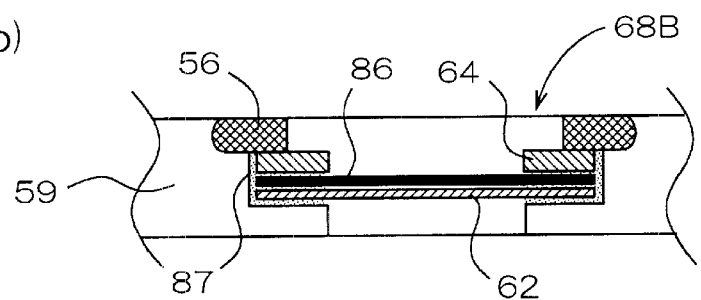
Figure 11C:
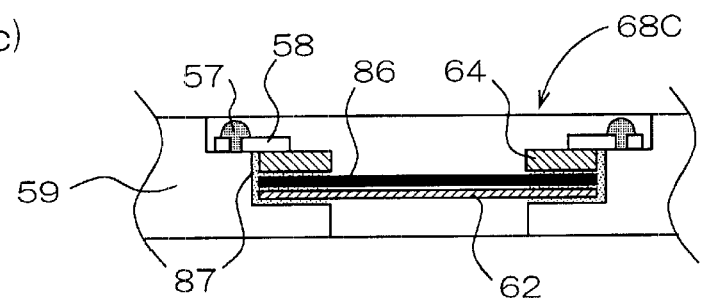

The method for fixing the resin film 63, etc. by caulking is not restricted to that shown in FIG. 10. FIGS. 11(*a*) to 11(*c*) are sectional views of pressure-releasing valves 68A to 68C obtained by other caulking method. In the pressure-releasing valve 61, caulking is conducted by bending the projection 66. Meanwhile, in the pressure-releasing valve 68A, caulking is conducted by fitting a ring 55 having an inclination at the outer circumference; in the pressure-releasing valve 68B, caulking is conducted by fitting a ring 56 having a convex (a bulge) at the outer circumference; in the pressure-releasing valve 68C, caulking is conducted by a ring 58 capable of fixing a washer 64 by crushing a rivet 57.

In forming the above-mentioned pressure-releasing valve by caulking, the structure of the pressure-releasing valve makes it difficult to control the stress of caulking at a particular level. For example, in the case of the pressure-releasing valve 61, it is thought to be possible that the stress of caulking is kept at a particular level by making constant the amount of bending of the projection 66; however, the stress of caulking differs depending upon the variation of the filling amount of the resin 87.

Figure 12:
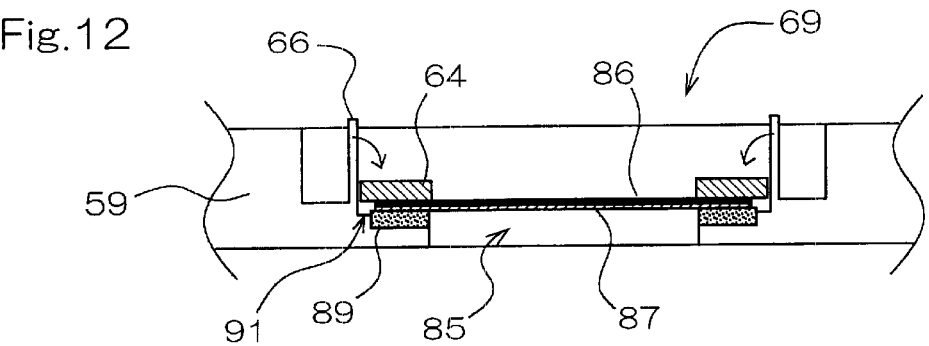
FIG. 12 is a sectional view showing still other embodiment of the structure of the pressure-releasing valve preferably used in the lithium secondary battery of the present invention.
Figure 13A:
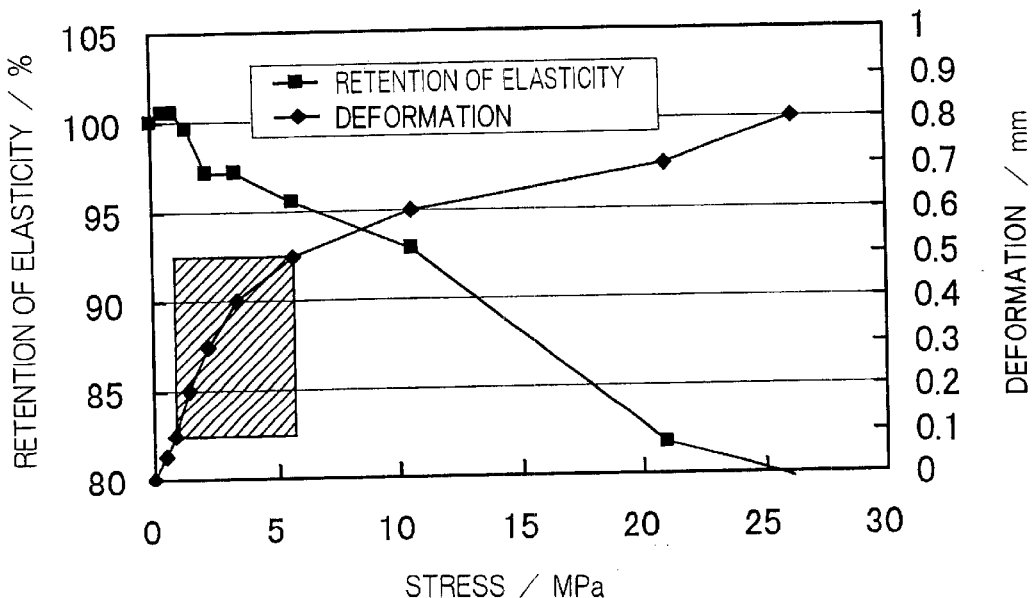
FIGS. 13(a)–13(d) are graphs each showing a relation in an elastomer between the retention of elasticity and the amount of deformation.
Figure 13B:
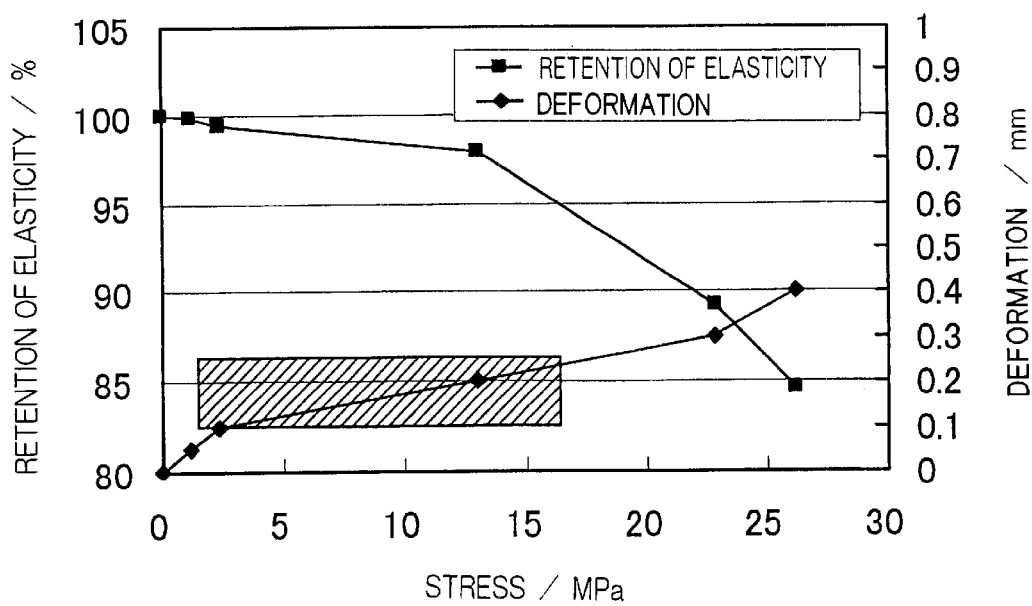
Figure 13C:
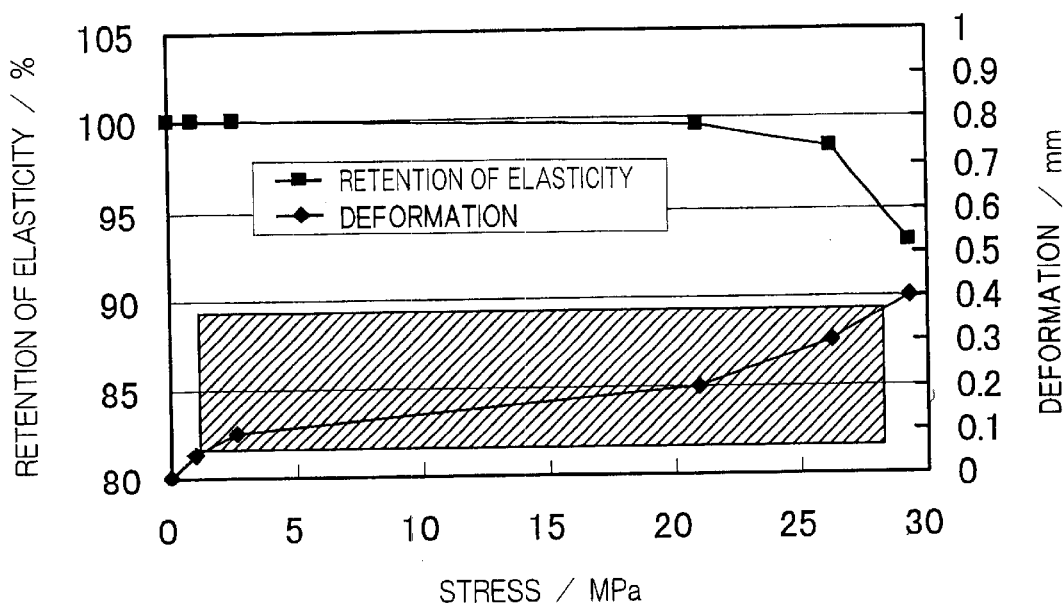
Figure 13D:
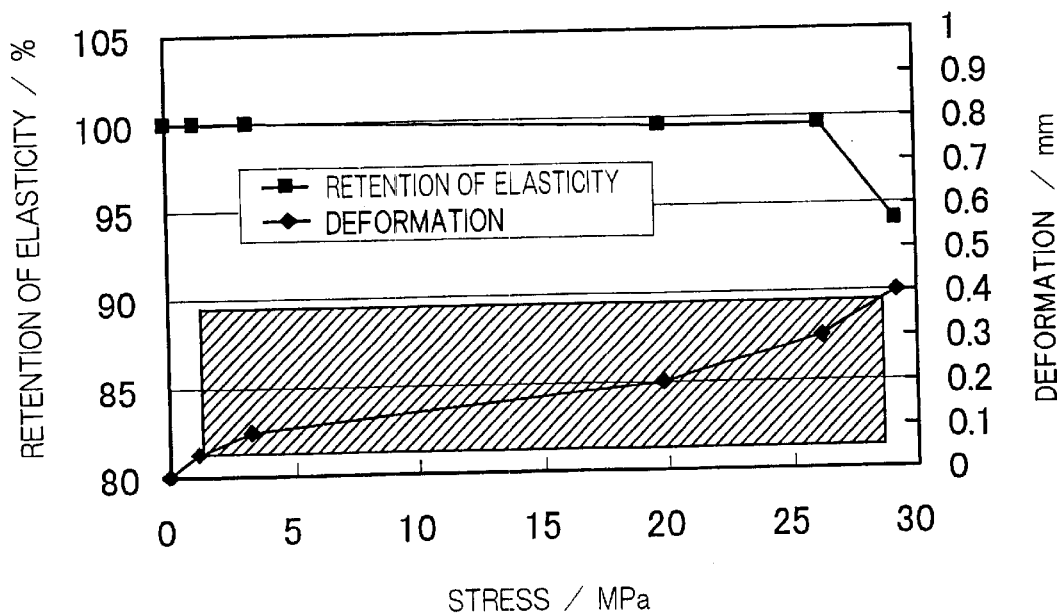

Therefore, in forming a pressure-releasing valve by caulking, it is preferred to use a means for controlling the deformation of an elastomer at a particular level. FIG. 12 shows a pressure-releasing valve 69 having a structure in which a packing 89 is used as an elastomer and, in order to control the deformation of the packing at a particular level, a stopper 91 is provided so that the amount of a washer 64 forced into the packing 89 side does not exceed a particular level. Thus, use, for one of the members pressure-welded to each other via an elastomer, of a stopper capable of controlling the deformation of the elastomer, is preferred for the purpose of controlling the stress of caulking and maintaining the property of the caulked part at a particular level.

In the above-mentioned pressure-releasing valve 51, 61, 68A to 68C or 69 (hereinafter referred to as "the pressure-releasing valve 51 or the like") comprising a resin film 63 and a metal foil 86, the resin film 63 and the metal foil 86 are adhered to each other with a resin 87 at their peripheries while they are present as independent films at the portions corresponding to the pressure-releasing hole 85. Therefore, the operable pressure of the pressure-releasing valve 51 or the like (the pressure at which the valve operates) is determined by the rupture pressure of the metal foil 86 or the rupture pressure of the resin film 63 and it does not follow that the operable pressure becomes very large by the combined use of the two members.

It is possible to form the pressure-releasing valve 51 or the like in a state that the resin film 63 and the metal foil 86 are adhered to each other. In that case, it is possible to set the operable pressure of the pressure-releasing valve 51 or the like similarly to the case using the metal foil 86 alone, by controlling the adhesive strength of the adhesive layer between the resin film 63 and the metal foil 86 or the burst pressure of the adhesive.

In formation of the pressure-releasing valve 51 or the like, adhesion of the metal foil 86 to the position of the lid 71A or 71B at which the pressure-releasing hole 85 is formed, has a connection with the tight sealing of battery case, because the pressure-releasing hole 85 is closed by the adhesion. In the present invention, it is possible to adhere two or more members with a resin or pressure-weld two or more members via an elastomer (including a resin), as mentioned previously; it is also possible to fill or apply a resin to or in the vicinity of the pressure-welded part of two or more members, whereby more reliable tight sealing of battery case can be obtained.

Figure 4:
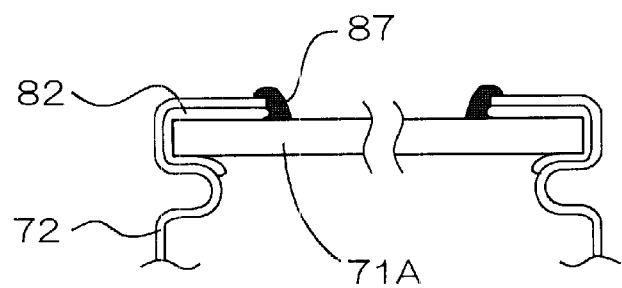
FIG. 4 is a sectional view showing an example of application of a resin to the positive electrode side of battery.

For example, FIG. 4 is a case in which a resin has been applied at the positive electrode terminal side of a battery 50. In the vicinity of the end of a battery case 72, bent by caulking is filled and cured a resin 87, whereby the sealing reliability of the caulked part can be further improved. In this case, since filling of the resin 87 is conducted at the final stage of battery assembling, it is impossible to conduct curing of the resin 87 by placing the whole battery 50 in a drier or the like. Curing of the resin 87 can be conducted by using, for example, an infrared heater enabling local heating.

Figure 5:
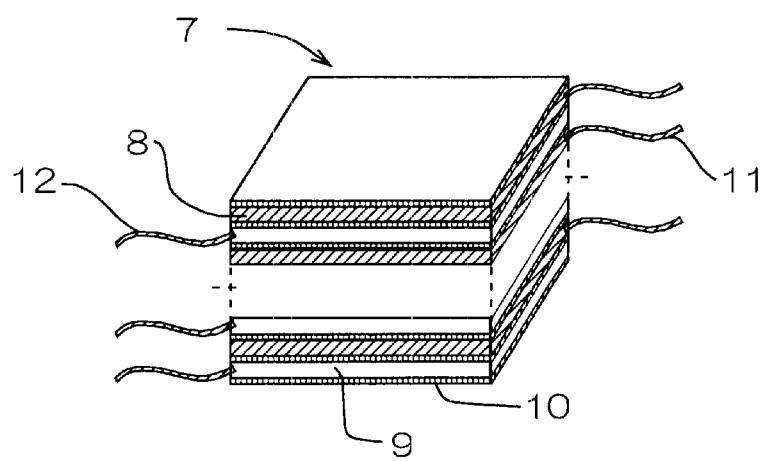
FIG. 5 is a perspective view showing the structure of a lamination type electrode body.

In the above, description has been made on the embodiments of the lithium secondary battery using a wound type electrode body, of the present invention. In the present lithium secondary battery, the electrode body may be a lamination type as shown in FIG. 5. In FIG. 5, a lamination type electrode body 7 is obtained by laminating a positive electrode 8 and a negative electrode 9 each of particular shape alternately with a separator 10 being placed between each two adjacent electrodes; to each electrode 8 or 9 is fitted at least one tab 11 or 12. The material for electrode 8 or 9, the method for production thereof, etc. are the same as for the electrodes of wound type electrode body.

Figure 6:
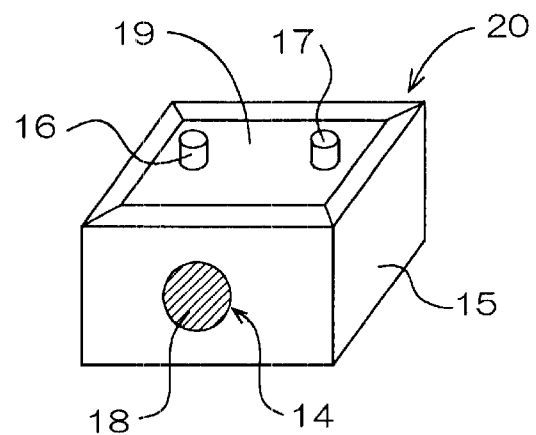
FIG. 6 is a perspective view showing one embodiment of the lithium secondary battery using a rectangular parallelepiped electrode body.

A perspective view of FIG. 6 shows one embodiment of the lithium secondary battery obtained by accommodating the rectangular parallelepiped electrode body 7 (not shown in FIG. 6) shown in FIG. 5, in a battery case. In the structure of a battery 20, a box with a bottom is used as a battery case 15; an electrode body 7 (not shown) is accommodated in the battery case 15; a tab 11 or 12 (not shown) is welded to a positive electrode external terminal 16 or a negative electrode external terminal 17 fitted to a lid 19; a projection or the like for positioning of the lid 19 is provided in the vicinity of the opening end of the battery case 19; a sealing agent is applied between the lid and the battery case 15 as in the case of sealing the end of the above-mentioned battery 50; the opening end of the battery case 15 is bent to obtain tight sealing of the battery case 15.

A pressure-releasing valve is formed in the battery case 15 preferably at a position facing the section of the lamination type electrode body 7. In the battery 20, therefore, the position becomes a side of the battery case 15. It is impossible to fit a thin metal plate to such a position at the inside of the battery case 15, according to conventional welding. As easily anticipated, fitting, at the side of the battery 20, of a projecting type pressure-releasing valve as disclosed in JP-A-9-92338 poses a problem in in-series or parallel connection of a plurality of batteries 20, or tends to incur the breakage of battery during handling.

However, it is easy to form a pressure-releasing hole 14 at the side of the battery case 15 by processing; also, it is very easy to close the pressure-releasing hole 14 at the inside of the battery case 15 by adhering a metal foil 18 with a resin. Of course, a resin can be filled at the bent part of the opening end of the battery case 15 in the same manner as in the case of the above-mentioned battery 50, in order to obtain more reliable sealing between the battery case 15 and the lid 19.

The lithium secondary battery of the present invention is not restricted as to the structure, as seen in the above embodiments; however, can preferably be employed as a battery of large capacity in which the formation of a pressure-releasing valve is desired at the two ends.

Specifically, the present battery is preferably employed as a battery having a capacity of 2 Ah or more. The present battery is not restricted as to the application, either; however, it can be used, for the low cost and high reliability, particularly preferably as a power source battery for driving an electric vehicle or a hybrid electric vehicle.

Next, the present invention is described by way of Examples. However, the present invention is not restricted to these Examples.

EXAMPLE 1

Figure 7:
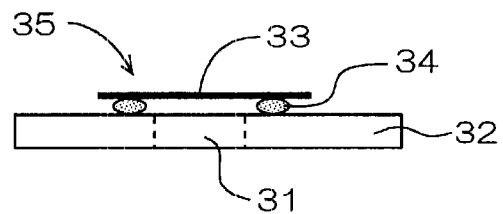
FIG. 7 is a sectional view showing the structure of a test sample.

Each sample 35 used for testing was produced as shown in FIG. 7 by adhering a metal foil 33 on one side of a disc 32 having a hole 31 in the center, with a polyimide 34, keeping the resulting material at the maximum temperature of 300° C. for 1 hour to cure the polyimide resin 34 and thereby close the hole 31. The materials, etc. used in production of the sample 35 are shown in Table 1. The disc 32 had an inner diameter of 6 mm, an outer diameter of 20 mm and a thickness of 2 mm.

TABLE 1

| Sample No. | Number of samples | Material of disc | Material of foil | Thickness of foil | Resin | Pressure in test | Test result |
|---|---|---|---|---|---|---|---|
| 1 | 10 | Cu | Cu | 10 μm | Polyimide | 2 atm. | No leakage in all samples |
| 2 | 10 | Al | Al | 10 μm | Polyimide | 2 atm. | No leakage in all samples |
| 3 | 10 | Al | Ni | 10 μm | Polyimide | 2 atm. | No leakage in all samples |

In order to examine the accelerated deterioration of the sealed part of each sample 35 (the part of disc 32 to which the metal foil 33 was adhered), each sample 35 was immersed in a solution (a non-aqueous electrolytic solution of lithium secondary battery) obtained by dissolving an electrolyte $LiPF_6$ in a mixed (50/50 by volume) solvent of EC and DEC, and kept in that state at 100° C. for 400 hours.

Figure 8:
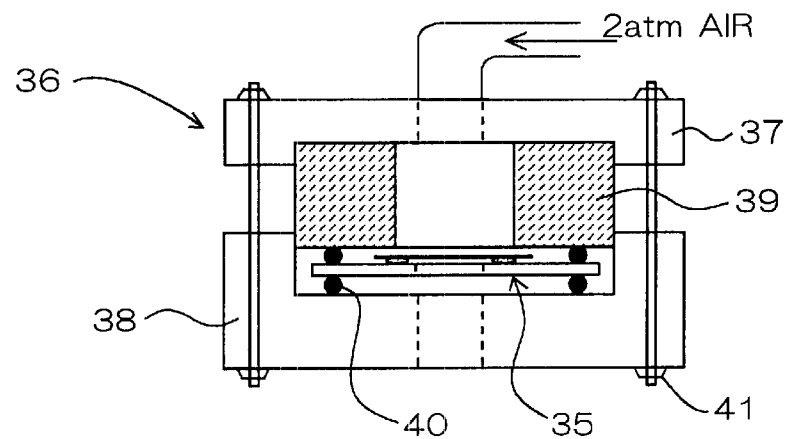
FIG. 8 is a sectional view showing the schematic structure of a testing apparatus for measurement of sealability.

Each sample 35 after the above treatment was placed in a test apparatus 36 shown in FIG. 8 to evaluate the sealing property of the sample. In the test apparatus 36, the sample 35 was interposed between a SUS-made thick ring 38 and a MC nylon-made cylinder 39 via packings 40 (the packings contacted with only the disc 32); and the cylinder 39, the sample 35 and the packings 40 were fixed by tightening the ring 38 and other SUS-made thick ring 37 using bolt/nuts 41. The test apparatus 36 was immersed in water; air of 2 atm. (about 0.2 MPa) was fed from a hole formed in the ring 37 to examine the generation or no generation of bubbles; thereby, leakage of air through the sample 35 was examined.

The test results are shown in Table 1. In all samples, there was no leakage through the sealed part of the sample. Therefore, it was confirmed that the sealed part formed using a polyimide resin shows good corrosion resistance to electrolytic solution and has good sealing property.

EXAMPLE 2

10 test samples with a pressure-releasing valve 69 having a structure shown in FIG. 12 were produced by using a stainless spring steel of 10.8 mm (outer diameter)×7.0 mm (inner diameter)×0.5 mm as the spacer 64, a fluororesin-coated metal foil of 10.8 mm (diameter)×0.1 mm as the metal foil 86, and an ethylene-propylene rubber of 10.8 mm (outer diameter)×7.0 mm (inner diameter)×1 mm as the packing 89 and by caulking the projection 66 using a stopper 91 so that the deformation of the packing 89 became 300 μm.

In order to examine the accelerated deterioration of the sealed part of each test sample, each test sample was immersed in a solution (a non-aqueous electrolytic solution of lithium secondary battery) obtained by dissolving an electrolyte $LiPF_6$ in a mixed (50/50 by volume) solvent of EC and DEC, and kept in that state at 80° C. for 1,000 hours. Each test sample after this treatment was evaluated for sealing property in the same manner as in Example 1, using the test apparatus 36 shown in FIG. 8.

In all test samples, there was no leakage through the sealed part of the sample. Therefore, it was confirmed that the sealed part formed by a combination of a packing and caulking shows good corrosion resistance to electrolytic solution and has good sealing property.

As described above, in the present invention, a pressure-releasing valve can be formed by a simple method and a battery case having tight sealing of improved reliability can be provided. Further in the present invention, since no large and costly equipment is required, battery production is easy and production yield is improved, and a battery of low cost and high reliability can be produced.

What is claimed is:

1. A lithium secondary battery comprising:
   an electrode body obtained by winding or laminating a positive electrode and a negative electrode via a separator,
   a non-aqueous electrolytic solution,
   at least one lid, and
   a battery case accommodating the electrode body and the non-aqueous electrolytic solution, wherein:
   (1) an elastomer is positioned between two or more members and said members are pressure-welded to each other, or
   (2) a resin is positioned between two or more members and the two or more members are pressure-welded to each other,
   and thereby the battery case has a seal between said two or more members,
   wherein the deformation of the elastomer in the load direction is larger than the spring-back amount of the pressure-welded portion and the stress applied to the elastomer is not smaller than 980 kPa and not larger than a level at which the retention of elasticity of the elastomer becomes 95%.

2. A lithium secondary battery according to claim 1, wherein the resin is an adhesive composed mainly of a polymide, or a polyolefin adhesive.

3. A lithium secondary battery according to claim 1, wherein said at least one lid has a pressure-releasing valve constituted by closing a pressure-releasing hole formed in said at least one lid, with a metal foil which is adhered to said at least one lid with said resin.

4. A lithium secondary battery according to claim 3, wherein the metal foil is pressure-welded to said at least one lid by crimping.

5. A lithium secondary battery according to claim 3, wherein the metal foil and a resin film having corrosion resistance to electrolytic solution are provided in layers in the pressure-releasing hole so that the resin film faces the interior of battery.

6. A lithium secondary battery according to claim 5, wherein the metal foil and the resin film are adhered to each other with an adhesive.

7. A lithium secondary battery according to claim 5, wherein the resin film is selected from the group consisting of a polyethylene, a polypropylene, a polyimide and a fluororesin.

8. A lithium secondary battery according to claim 3, wherein the metal foil is composed mainly of Al, Cu or Ni.

9. A lithium secondary battery according to claim 3, wherein the metal foil is coated with a fluororesin.

10. A lithium secondary battery according to claim 3, wherein a stopper is provided for at least one of the members pressure-welded to each other via an elastomer, for controlling the deformation of the elastomer, said stopper being provided in the pressure-releasing hole formed in said lid.

11. A lithium secondary battery according to claim 3, wherein said two or more members comprise said metal foil and said at least one lid.

12. A lithium secondary battery according to claim 3, wherein said two or more members comprise said metal foil and said case.

13. A lithium secondary battery according to claim 1, wherein said at least one lid has a pressure-releasing valve constituted by closing a pressure-releasing hole formed in said at least one lid, with a metal foil by means of bending a projection of said at least one lid formed in the vicinity of the pressure-releasing hole, to crimp the metal foil via a spacer.

14. A lithium secondary battery according to claim 13, wherein the spacer is made of a metal material having a Young's modulus of 170 GPa or more.

15. A lithium secondary battery according to claim 13, wherein the spacer is ring-shaped and has a curvature at the inner edge.

16. A lithium secondary battery according to claim 15, wherein the radius of the curvature at the inner edge of the spacer is 30 $\mu$m or more and ½ or less of the thickness of the spacer.

17. A lithium secondary battery according to claim 1, wherein the elastomer is a packing processed to a required dimension.

18. A lithium secondary battery according to claim 1, wherein the elastomer is selected from the group consisting of an ethylene-propylene rubber, a polyethylene, a polypropylene and a fluororesin.

19. A lithium secondary battery according to claim 1, wherein a stopper is provided for at least one of the members pressure-welded to each other via an elastomer, for controlling the deformation of the elastomer.

20. A lithium secondary battery according to claim 1, wherein the non-aqueous electrolytic solution contains a carbonic acid ester organic solvent.

21. A lithium secondary battery according to claim 1, which uses, as the positive electrode active substance, a lithium manganese oxide spinel composed mainly of Li and Mn.

22. A lithium secondary battery according to claim 1, which has a capacity of 2 Ah or more.

23. A lithium secondary battery according to claim 1, which is used in an electric vehicle or a hybrid electric vehicle.

* * * * *